March 5, 1957  F. P. GOOCH ET AL  2,783,615
TORUS CHAMBER TYPE FLUID COUPLING
Filed Nov. 30, 1954  6 Sheets-Sheet 3
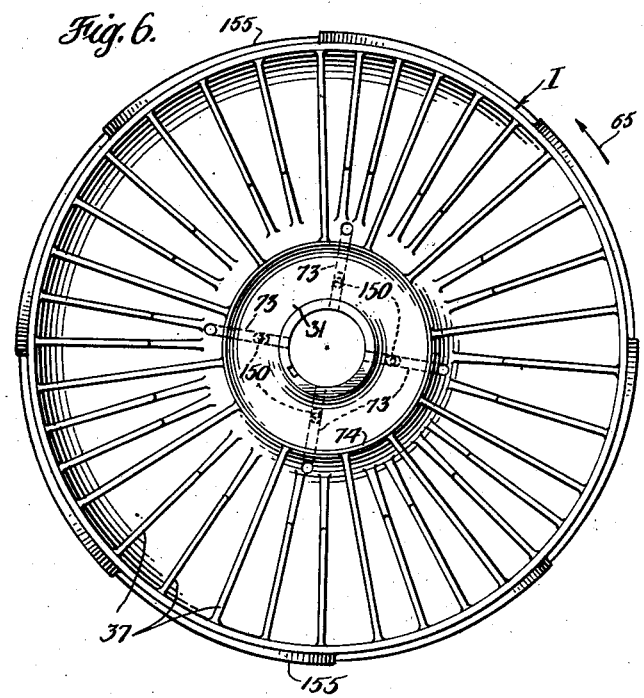
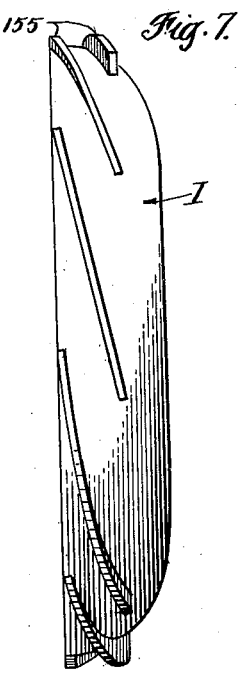
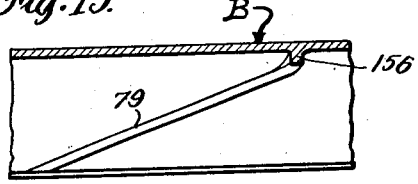
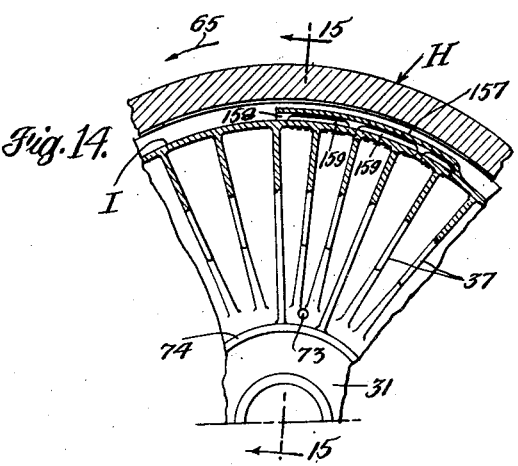
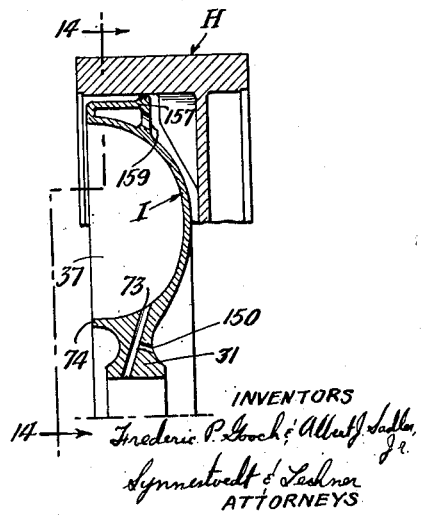
INVENTORS
Frederic P. Gooch & Albert J. Sadler, Jr.
Synnestvedt & Lechner
ATTORNEYS

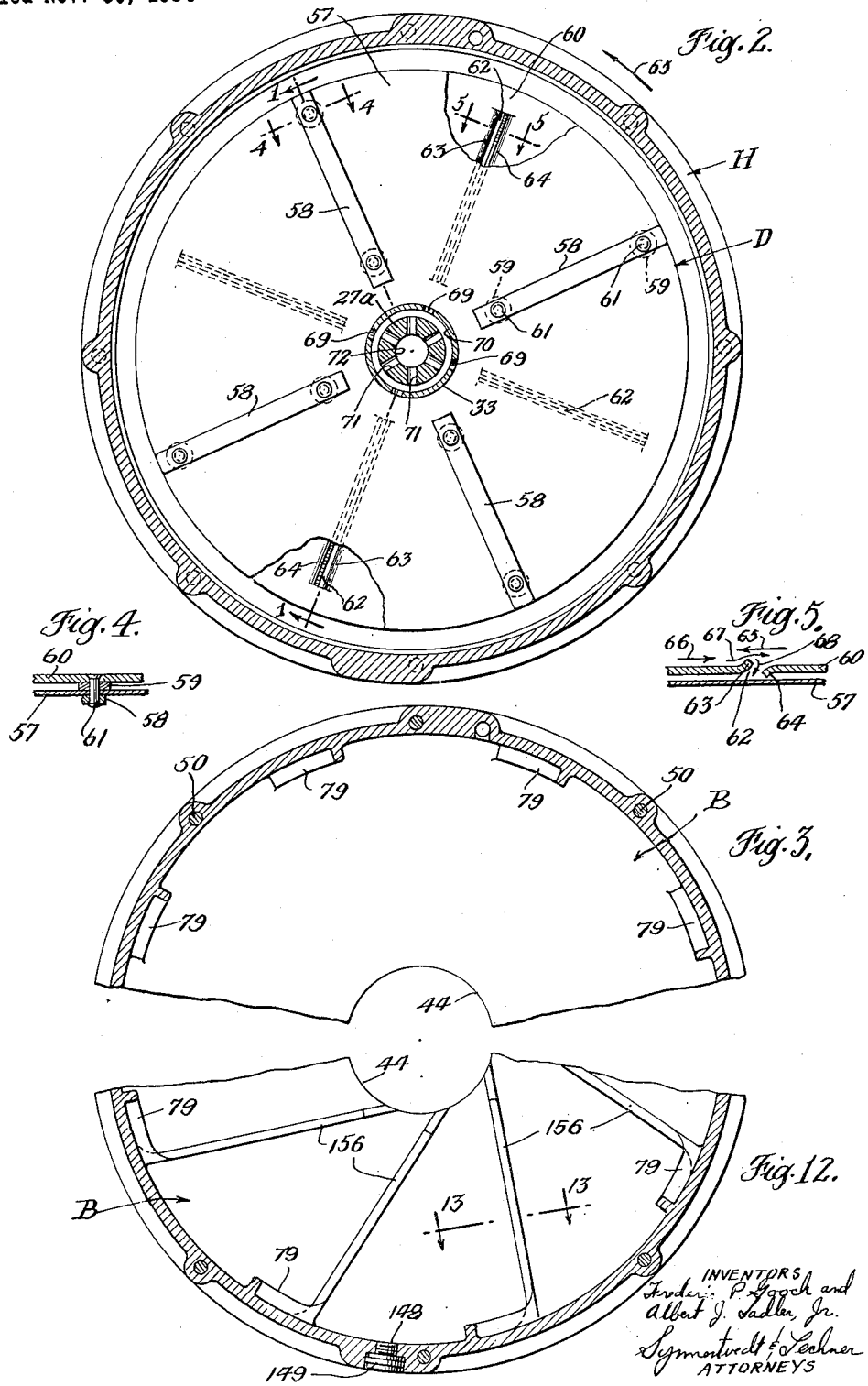

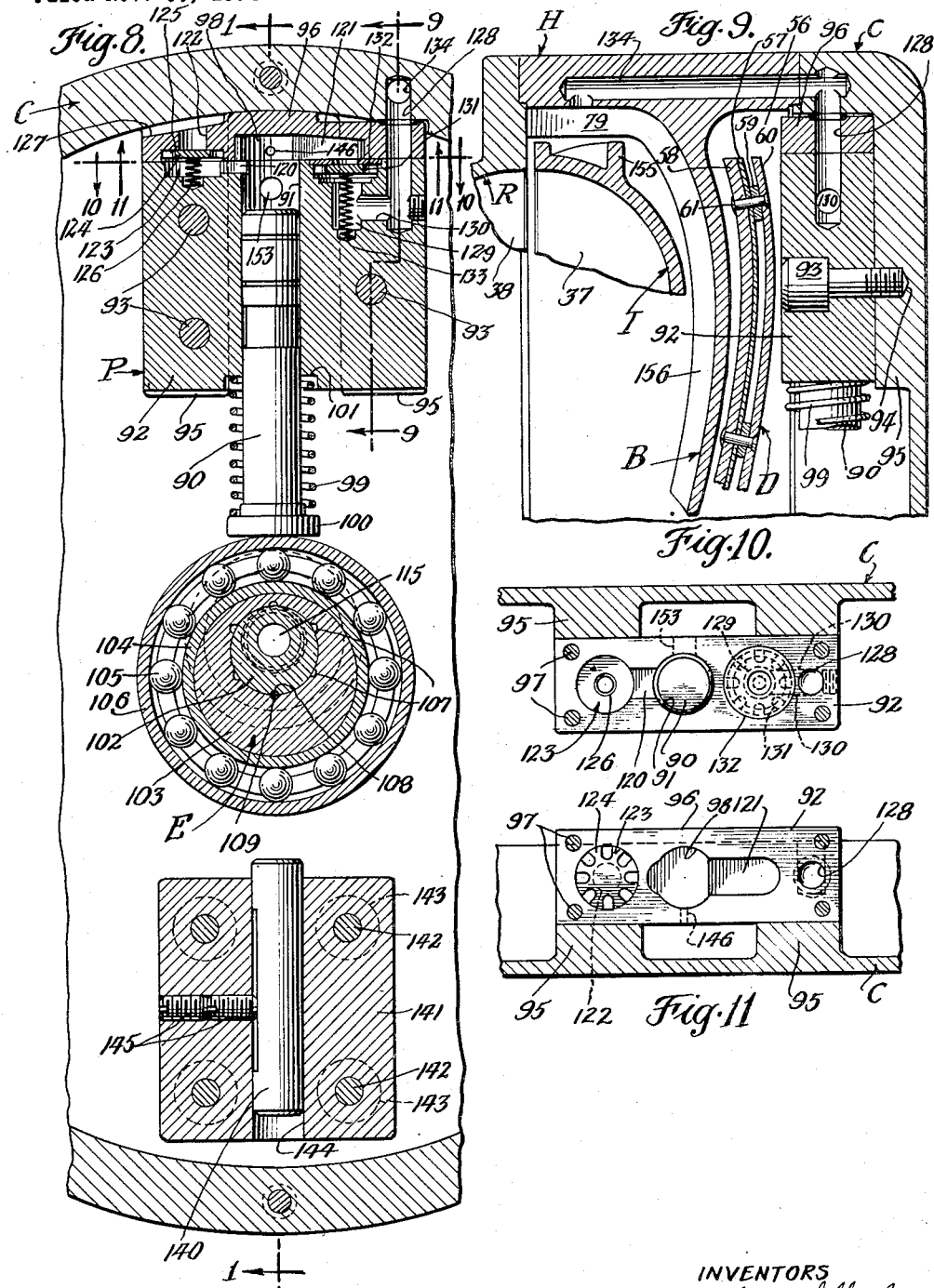

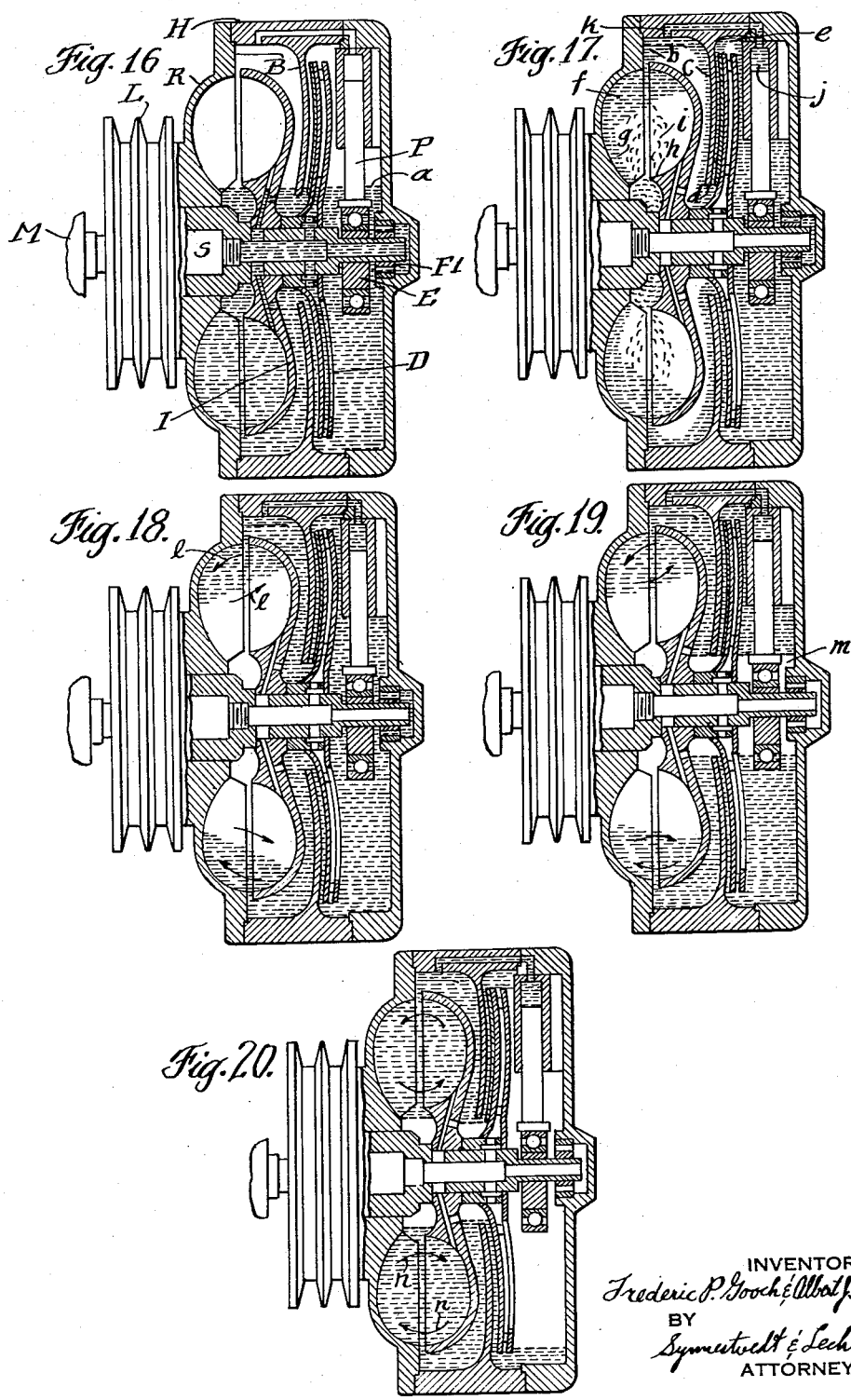

United States Patent Office 2,783,615
Patented Mar. 5, 1957

2,783,615

TORUS CHAMBER TYPE FLUID COUPLING

Frederic P. Gooch, Media, and Albert J. Sadler, Jr., Sauderton, Pa.

Application November 30, 1954, Serial No. 471,971

18 Claims. (Cl. 60—54)

This invention relates to fluid clutches and, more particularly, to fluid clutches which are especially adapted for use in coupling the drive shaft of a prime mover, such as a motor, with a relatively high inertia load.

Certain problems arise when a relatively high inertia load is to be brought up to the speed of rotation of a drive shaft. Typical situations of the kind here contemplated are encountered in centrifugal separator equipment used in sugar refining, in continuous belt type stone conveyors, etc. The equipment of the invention is particularly well suited to facilitate the acceleration of such high inertia loads without placing an undue burden on the prime mover.

With certain types of prime movers and loads, it has been known to utilize a fluid clutch having an impeller or driving member connected with the shaft of the prime mover and a runner or driven member connected with the load. The impeller and runner are formed so as to delimit a working or clutch chamber between their faces. Both the impeller and the runner are provided with a plurality of generally radial vanes or fins within the clutch or driving chamber. Upon rotation the vanes of the impeller propel the hydraulic fluid or oil toward the runner which causes it to rotate. The fluid in the clutch chamber thus travels in a vortical path under the constant propulsion of the vanes of the impeller. When the clutch chamber between the impeller and runner is substantially full of hydraulic fluid, the runner should operate at a speed within about 2 or 3% of that of the impeller. The less oil there is in the chamber, the greater will be the difference in speed between the impeller and the runner or, the greater will be the "slippage."

During start up, the load inertia imposes a heavy torque on the runner which reacts on the impeller via the hydraulic fluid in the chamber. This high torque, which may run as high as several hundred percent of full load, imposed directly on an electric motor shaft for a substantial period of time may well cause an excessive increase in motor amperage leading to overheating and permanent damage to the insulation, etc. In order to avoid the imposition of high torque during the start up, it has been known to substantially empty the hydraulic fluid out of the clutch chamber by means of external pumps, piping and reservoirs prior to the commencement of rotation of the impeller and, after the impeller has accelerated up to the desired speed, to gradually refill the clutch chamber with hydraulic fluid. This type of operation aids in limiting the torque imposed and in maintaining torque at a safe level throughout the start up period.

The primary object of the invention is to provide equipment for quickly removing most of the hydraulic fluid from the clutch or driving chamber during initial start up and, after the impeller has attained substantially full speed, gradually feeding the fluid back into the chamber in order to bring the runner and load up to the desired speed and to accomplish this in a greatly simplified and efficient manner with equipment which is self-contained, self-regulating and requires no exterior piping, pumping, or other fluid handling equipment.

Another object of the invention is the provision of completely automatic means for rapidly emptying the working chamber during start up and refilling it relatively slowly, but as fast as possible without excessively overloading the prime mover.

Yet another object is the provision of pumping means contained within the housing which utilizes the difference in rotational speed between the impeller and runner to provide the pumping action needed to refill the clutch chamber in order to bring the load gradually up to speed.

The invention also has as an object the provision of means for collecting, in a reservoir, the fluid which is ejected from the clutch chamber during start up and, at the same time, delivering air from the reservoir into the clutch chamber to compensate for oil removed.

Still another object of the invention is the provision of means for varying the effective pump displacement by venting the pump cylinder to the reservoir during a portion of the piston stroke.

How the foregoing and other objects and advantages of the invention are attained will appear more fully from the following description referring to the accompanying drawings, in which:

Figure 2 is a cross-sectional view taken generally along the line 2—2 of Fig. 1 but on a reduced scale as compared with Fig. 1;

Figure 3 is a fragmentary cross-sectional view of the housing baffle of Fig. 1, this view being taken along the line 3—3 of Fig. 1 but on the scale of Fig. 2;

Figure 4 is a fragmentary cross-sectional view taken along the line 4—4 of Fig. 2;

Figure 5 is a fragmentary cross-sectional view taken generally on the line 5—5 of Fig. 2;

Figure 6 is a face view of an impeller similar to that shown in Fig. 1, looking toward the right in Fig. 1 but on the scale of Fig. 2 and including peripheral vanes;

Figure 7 is a side view of the impeller of Fig. 6, this view looking toward the left in Fig. 6;

Figure 8 is a fragmentary vertical cross-sectional view through the pump mechanism taken on the line 8—8 of Fig. 1;

Figure 9 is a cross-sectional view on the line 9—9 of Fig. 8, this view also showing a modified housing baffle associated with the impeller shown in Figs. 6 and 7;

Figure 10 is a plan sectional view on the line 10—10 of Fig. 8;

Figure 11 is a section looking up in Fig. 8 as indicated generally by the line 11—11;

Figure 12 is a fragmentary sectional view similar to Fig. 3 but of the modified housing baffle shown in Fig. 9;

Figure 13 is a fragmentary cross-sectional view taken generally on the line 13—13 of Fig. 12;

Figure 14 is a fragmentary cross-section of a second modified form of impeller taken on the line 14—14 of Fig. 15;

Figure 15 is a fragmentary cross-section of the modified form of impeller shown in Fig. 14, this view being taken along the line 15—15 of Fig. 14;

Figures 16 to 20 are diagrammatic sectional views similar to but on a reduced scale as compared with Fig. 1, these views showing the position of the oil during various phases of the operation.

Figure 1:
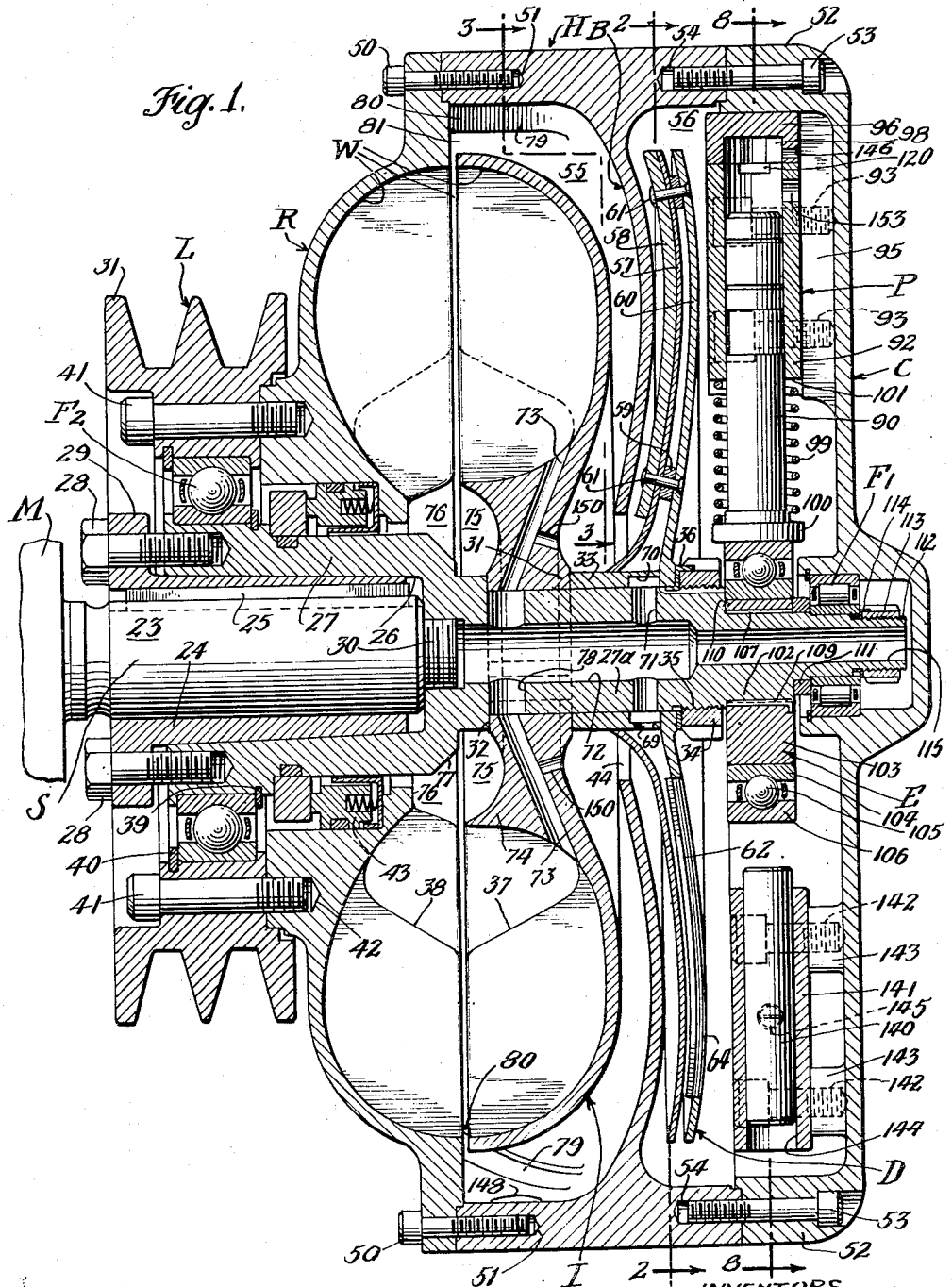
Figure 1 is a vertical section through a fluid clutch constructed according to the invention, said section being generally along the line 1—1 of Fig. 8 but with the shaft baffle taken as indicated by the line 1—1 of Fig. 2.

Preliminarily and with special reference to Fig. 1, a general description of the equipment of the invention will be useful in understanding the details of operation. The impeller or driving member I and the runner or driven member R are coaxially mounted in face-to-face relation, their adjacent faces being of concave configuration to provide a working or clutch chamber W. The impeller I is mounted for rotation with the shafting S driven by the motor M. Also mounted for rotation with the shafting and impeller are shaft baffle D and a pump driving eccentric E.

The runner R together with a load pulley L, a housing member H, a housing baffle B, a cover plate C and a pump P are all mounted for rotation as a unit independently of the shafting S on the roller bearings F1 and the ball bearings F2. During normal operation, the motor M drives the shafting S and thereby the impeller I, the shaft baffle D and the eccentric E. The runner R and other elements mounted therewith are rotated under the action of the hydraulic fluid set in motion by the impeller.

Referring to the drawings in more detail, in Fig. 1, the shaft 23 of the motor M fits into the split sleeve adapter 24 and is keyed thereto as at 25. The exterior surface of the adaptor 24 is tapered for cooperation with a correspondingly tapered bore 26 in the stepped drive shaft 27. These tapered surfaces are held tightly together by machine screws 28 which pass through a flange 29 on the adaptor and into tapped holes in the end of the shaft. From the foregoing it is evident that the drive shaft 27 is firmly secured to the motor shaft 23 both by means of the taper lock of adaptor 24 and by means of the key 25. (A plug 30 separates the bore of shaft portion 27 from the bore of shaft portion 27a, described hereinafter.)

The impeller I is mounted and keyed on a shaft portion 27a of smaller diameter than the main section 27 and the impeller hub 31 abuts a shoulder 32 on the shaft 27. Shaft baffle D is mounted on spacer sleeve 33, which surrounds shaft 27a and is keyed thereto in position to abut the hub 31 of the impeller. The impeller, spacer sleeve and shaft baffle are held in place on shaft 27a by nut 34 screwed onto threaded portion 35 and locked in place by lock washer 36.

The impeller I is provided with a plurality of vanes or fins 37 on the inner face which, during rotation of the impeller, propel hydraulic fluid into the path of the vanes 38 of the runner R.

The pulley L, which is mounted on ball bearings F2 (retained by means of rings 39 and 40), is provided for cooperation with a belt or chain for driving the load (not shown). The runner R is secured to the pulley L by means of machine screws 41 and tapped holes 42 in the runner. Suitable oil seal mechanism 43 is provided to prevent the escape of hydraulic fluid.

The housing H generally surrounding the impeller I, is fixed to the runner R by means of machine screws 50 passing through the runner and into tapped holes 51 in the housing. The rim flange 52 of cover plate C is fastened to the housing H with machine screws 53 which screw into tapped holes 54. Thus the runner R, housing H and cover plate C form an enclosure within which the other elements of the invention operate.

Housing baffle B, extending inwardly from the housing H, may be curved to conform generally to the contour of the back of the impeller and spaced therefrom. This housing baffle divides the interior of the housing into an impeller chamber 55 and a reservoir 56. It has a bore 44 which is of a diameter large enough to provide an annular space adjacent the shafting through which space hydraulic fluid may pass.

The pump P, to be described in detail hereinafter, is located within and draws from the reservoir 56.

The shaft baffle D, mentioned above, performs two functions. In the first place it provides air removal means adapted to separate the air from the oil in the reservoir and conduct it inwardly toward the shafting. In the second place it provides a disc near the housing baffle which acts as a centrifugal pump to throw oil passing through the central hole in the housing baffle outwardly into the reservoir. While these two functions are advantageously performed by the unitary shaft baffle D, by structure to be described in more detail, nevertheless the functions could be carried out by separate structures without departing from the spirit of the invention.

The shaft baffle D follows the contour of the housing baffle B, is arranged closely adjacent thereto and rotates within the reservoir 56. It comprises (see Figs. 1 and 2) a front disc 57 carrying a plurality of radial fins 58 on the face adjacent the housing baffle and, spaced from the opposite face thereof by spacer rings 59, a rear disc 60, all of which elements are fastened together by rivets 61 (see Fig. 4). The fins 58 act to throw the fluid outwardly into the reservoir chamber.

The rear disc 60 has a plurality of slot-like air passages 62 (Figs. 2 and 5), the edges of which are oppositely bent as at 63 and 64 to provide protruding lip-like portions. The lip 64, along the trailing edge of the slot is offset from the leading edge in the direction of the front disc 57. With a direction of rotation as indicated by arrow 65, the frothy mixture of air and hydraulic fluid travels, with respect to disc 60, in the direction of arrow 66. As the mixture travels past the leading lip 63, the inertia of the hydraulic fluid will tend to cause it to travel, as indicated by arrow 67, on past the slot 62 while the air, having little inertia, will change direction and pass through the aperture as indicated by arrow 68. Any oil that does enter the slot will be thrown outwardly between the discs and thus be returned to reservoir space 56.

The air separated from the hydraulic fluid passes through the holes 69 in the spacer sleeve 33, the manifold chamber 70 in the spacer sleeve and apertures 71 into the bore 72 of the shaft 27a.

Attention is now turned to the details of the hub 31 of the impeller I, as best seen in Figs. 1, 6, 14 and 15. A plurality of air feed-in ports or passages 73 are provided which extend from the bore into the clutch chamber of the impeller. The annular ridge 74 is shaped to provide a concave annular pocket 75 adjacent the shoulder 32 on the shaft 27. A roughly corresponding annular pocket 76 is provided in the runner R by chamfering the shoulder on the shaft 27 as at 77 and stopping the blades 38 of the runner short of protrusion into the inner region adjacent the shaft 27. These pockets 75 and 76 form a spoiler chamber the function of which will be described later. The air passages 73 are in communication with the bore 72 of the shaft 27a via the holes 78.

A plurality of vanes or fins 79 (see Figs. 1 and 3) are provided on the interior of the housing adjacent the peripheral surface of the impeller I. These vanes may be disposed at an angle with respect to the axis of the shafting so that the tip 80 adjacent the runner is the leading point of the vane. Thus, with a direction of rotation indicated by the arrow 65 in Figs. 2 and 6, the fluid centrifugally thrown into the clearance space 81 between the periphery of the impeller and the vane tips 80 will contact the leading tips 80 of vanes 79 and will be led along the sides of the vanes away from clearance space 81 and toward the housing baffle B. The pressure which tends to develop in the fluid in the chamber 55 as a result of the velocity head of the fluid leaving the impeller, causes the fluid to flow inwardly along housing baffle B and through bore 44, at which point it is contacted by the vanes 58 on the shaft baffle D and thrown outwardly into reservoir 56.

Attention is now turned to the mechanism of the pump P best shown in Figs. 1 and 8 to 11. A piston 90 is arranged for reciprocation into and out of the pump cylinder 91 in the cylinder block 92 secured to the inside of the cover plate C by machine screws 93 passing through the block 92 and into tapped holes 94 in pads 95—95 formed on the cover plate C. A block cap member 96, secured to the block by machine screws 97 (Figs. 10 and 11) has a counterbore 98 which forms an extension of the cylinder 91.

A spring 99 surrounds the portion of the piston protruding from the cylinder and, by means of abutment against a shoulder 100 on the end of the piston 90 and against the bottom of recess 101 in the cylinder block, urges the piston out of the cylinder (in an inward direction toward the axis of the drive shaft 27).

The eccentric E, which drives the piston 90 into the cylinder 91, is conveniently in the form of an inner circular portion 102, which may be an integral part of the stepped shafting S, and an outer portion 103 fitting over the portion 102 and within the inner race 104 of the ball bearing 105 whose outer race 106 contacts the end of the piston. The piston end 100 may be formed of a material having good bearing properties, such as nylon, and it would then be possible to eliminate the ball bearing and allow the piston to contact the surface of the eccentric directly.

As seen in Fig. 8 the outer eccentric member 103 has a plurality of semi-circular slots 107 spaced around the inner edge. The inner eccentric 102 is provided with a single slot 108. Thus the degree of eccentricity, the travel of the piston and thus the pump displacement can be adjusted by rotating the outer member 103 until one of the slots 107 is positioned opposite the slot 108 and then inserting the pin 109 to lock the two members against further relative motion. As illustrated in Fig. 8, the two eccentrics are arranged for maximum total throw. When the throw of the eccentric is altered, it is desirable to employ a longer or shorter piston 90 as may be necessary in order to maintain a substantially constant clearance space between the end face of the piston and the bottom of the counterbore 98.

It may be satisfactory in some applications to use a conventional single eccentric, and, if this is done, pump displacement can be varied by changing eccentrics. Other means for varying pump displacement will be described in detail hereinafter.

It is here mentioned that the piston 90 is advantageously made in the form of a thin walled hollow cylinder, closed at both ends, and of a lightweight substance, such as aluminum. Such construction is peculiarly important in the pump of the invention since, after the housing picks up speed, the entire cylinder block rotates while the piston is traveling into and out of the cylinder. Making the piston as light as possible minimizes the effect of centrifugal force on pump operation and avoids the use of a heavy and powerful spring 99.

The eccentric E and surrounding ball bearing assembly are mounted on the shaft 27a against a shoulder 110. The end of shaft 27a is journalled in roller bearings F1 mounted in cover plate C and terminates in a threaded portion 112 cooperating with a nut 113 and lock washer 114 for maintaining the roller bearing F1, spacer ring 111 and eccentric E in proper axial position. As the housing assembly comes up to speed the oil being thrown toward the outside forces the air inwardly toward the center of rotation, from whence it escapes through roller bearing F1 and bore 115 into bore 72 where it mixes with that drawn through slots 62, holes 69, manifold 70 and holes 71, and flows out through holes 78 and passages 73 into the working chamber W to take the place of oil discharged therefrom.

Attention is now turned to the disc type inlet and outlet valves for the pump shown in Figs. 8 to 11.

The cylinder 91 has an inlet port 120 and an outlet port 121. The inlet port connects with an intake passage 122 via a valve chamber 123 in which the valve member or disc 124 is urged towards its seat 125 by means of the spring 126 abutting the valve member 124 and the bottom of a counterbore in the cylinder block 92. The passage 122 is in communication with the reservoir 56 (see Fig. 1) by means of a cut-out portion 127 in the cap 96.

The outlet port 121 connects with the discharge passage 128 via the valve chamber 129 and the short interconnecting passage 130. The outlet valve member or disc 131 is urged toward the seat 132 by means of the spring 133 abutting against the valve member and against the bottom of the counterbore in the cylinder block 92.

Attention is particularly called to Figs. 10 and 11 where it can be seen that the inlet valve member 124 and the outlet valve member 131 are each constructed in the general form of a circular disc having a plurality of notches evenly spaced around the periphery. When either of these discs is against its valve seat (125 or 132), the flow passage is occluded by the central solid portion of the disc. On the other hand, when either of the valve members is displaced (against the force of the respective springs 126 and 133), flow of hydraulic fluid is possible around the edge of the disc through the plurality of notches. It is advantageous to have the resilient means (springs 126 and 133) urge the valve discs outwardly toward flow occluding position. Since the springs and centrifugal force thus have a cumulative rather than a differential effect, it has been found to be of considerable importance to make the discs of a light weight material such as nylon.

As best seen in Fig. 9, the discharge passage 128 connects with passage 134 in the housing H which leads to the region of the vanes 79. From this region the fluid can readily pass between the impeller I and the runner R and into clutch chamber W.

During the suction stroke, when the piston is moving in a direction out of the cylinder, the inlet valve opens and the outlet valve closes. On the pumping stroke, when the piston is traveling into the cylinder, the inlet valve automatically closes, the outlet valve opens and fluid is forced through the discharge passages.

In order to at least partially offset the unbalance which may result from the rotation of the entire pump assembly, counterweights 140 and 141 (see Figs. 1 and 8) are provided which may be secured to the cover plate C by machine screws 142 screwing into tapped holes in bosses 143. The counterweight 140 may be fixed in any desired position in the bore 144 of the counterweight 141 by tightening the double set screws 145. It is sometimes desirable to replace the counterweights 140 and 141 with one or more lighter or heavier counterweights.

With the arrangement above described the relative motion or difference in rotational speed between the shifting S and the housing H results in a reciprocating motion of the piston into and out of the cylinder. During start up, the motor and shafting reach substantially full speed quite rapidly whereas the housing comes up to speed more slowly. Consequently, during the earlier phase of operation, the difference in speed between the shafting and the housing is relatively large, the piston reciprocates rapidly and the pump delivery is relatively high. On the other hand, as the runner and housing approach running speed, the relative velocity between the shafting and the housing falls off and the piston reciprocates more slowly.

The capacity or displacement of the pump P may be varied by means of one or more ports in the cylinder wall venting the cylinder 91 to the reservoir 56 but adapted to be covered by the piston on the pressure stroke. The drawings illustrate a relatively small bleeder port 146 and a relatively large bleeder port 153. The large port is longitudinally spaced from the small port toward the shafting. The size and longitudinal position of the small port are selected to give best results in a given application of the clutch. The minimum size of the large port is sufficiently large so that it will render the pump ineffective until covered by the piston. The longitudinal position of the large port is selected in order to provide a pump having desired capacity.

If the large port is located nearer the shafting S, then the pump will have a relatively high capacity, since the port will be covered by the piston after a relatively small portion of its travel into the cylinder. On the other hand, if the large port is located farther from the shafting S, the pump will have a relatively small capacity, since hydraulic fluid will be able to escape out the port during a larger portion of the pumping stroke of the piston. In general, the large port is located in the piston wall between the piston position corresponding to dead center at the end of the suction stroke and the piston position after it has traveled approximately one half of the pressure stroke. It will be seen from the foregoing that our improved pump can be readily employed to meet a wide variety of individual requirements.

When the shafting S is rotating at a relatively high R. P. M. and the housing H at a relatively low R. P. M., the pump piston is traveling into and out of the cylinder so rapidly that whether or not the small bleeder port 146 is open or closed makes little difference in the overall operation of the pump in connection with the operation of the clutch as a whole. However, as the housing approaches running speed, the port 146 becomes increasingly more effective in determining pump capacity. The larger the small port the sooner it will begin to have a significant effect on the pump displacement. Since the oil remaining in the cylinder after the small port is covered by the piston can only escape through the discharge valve, the farther the small port is from the cylinder bottom the greater will be the pump displacement and the faster will the oil be delivered to the impeller chamber.

As seen in Figs. 1 and 12, a tapped hole 148 is provided through which the hydraulic fluid may be supplied or removed. A plug 149 may be screwed into the hole to prevent leakage.

A plurality of passages 150 (see Figs. 1 and 6) in the hub of the impeller communicate with passages 73 and permit entrapped air to escape into clutch chamber W during start up.

During normal running the excess oil supplied by the pump P to the clutch chamber W spills through bore 44 in the housing baffle B and returns to reservoir 56.

Attention is now turned to a modification of the impeller. As best seen in Figs. 6, 7 and 9, the impeller shown in Fig. 1 may be provided with a plurality of generally helical vanes 155 on the peripheral surface. These vanes augment the tendency of the oil to travel along the vanes 79 away from the clearance space 81, above described. It is contemplated that in certain special applications, such as extremely high loads, an impeller having these helical vanes may be advantageously employed.

When an impeller having helical vanes is used, it may prove desirable to extend the vanes 79 inwardly along the housing baffle, as shown at 156 in Figs. 9 and 12, in a generally radial direction with respect to the housing baffle B. These generally radial vanes 156 aid in guiding the hydraulic fluid toward the bore in the housing baffle and in preventing the body of hydraulic fluid in the impeller chamber 55 from traveling around with the impeller.

The embodiment shown in Figs. 14 and 15 will be described next. As there seen, a further modification of the impeller may prove advantageous in certain applications. In this form a plurality of scoops 157 are provided around the peripheral surface of the impeller. With a direction of rotation as indicated by the arrow 65 (Fig. 14), the leading end of each scoop is open as at 158 so that oil will flow into the body of the scoop. A plurality of axially disposed discharge openings 159 are provided along the back of the scoop which emit fluid toward the housing baffle.

It is pointed out that both the helical vanes described above in connection with Figs. 6 and 7, and the scoops described in connection with Figs. 14 and 15, are means which may be employed to assist in removing oil from the region of the clearance space, and thus, in effect, to assist in emptying the clutch chamber W.

The operation of the invention will be described next and, for this purpose, attention is particularly directed to Figs. 16 to 21.

Figures 16 to 20 are small diagrammatic views, each view showing the distribution of oil and air during a phase in the operation of the clutch.

With special reference to Fig. 16, the motor M drives the shafting S on which the impeller I, the shaft baffle D and the eccentric E are mounted for rotation. The load pulley L is secured to the runner R which carries the housing H together with the housing baffle B and the pump P, all of which elements rotate as a unit on bearings F1 and F2 (see Figure 1) independently of the shafting S. For the sake of clarity these reference characters are shown in Fig. 16, while being omitted from Figs. 17 to 20.

Fig. 16 shows the equipment at rest with the oil rising to level $a$. All of the chambers and passages below oil level $a$ will, of course, be full of oil.

Fig. 17 shows the distribution of the oil immediately after the motor is started. The oil is thrown out between the impeller and runner as at $b$ and into the path of the vanes on the housing. These vanes change the direction of travel of the oil and prevent it from rotating as a fluid body with the impeller. It then travels along the housing baffle as at $c$, and at $d$, it is picked up and thrown outwardly into the reservoir as at $e$ by means of the shaft baffle, which acts as a centrifugal pump during this phase of the operation. The oil in the passages in the shafting has been thrown outwardly and replaced by air. The impeller throws oil into the runner and a portion of the oil $f$ in the clutch chamber thus travels inwardly as at $g$ along the runner toward the shafting. This layer of oil $g$ is prevented by the spoiler ridge from continuing around into the path of the impeller and instead flows as at $h$ into the spoiler chamber where it becomes extremely turbulent. As indicated at $i$, the oil is thrown from the spoiler chamber outwardly into the main body of oil $f$ in the clutch chamber. The pump cylinder is filled with oil $j$ and, since the pump is operating at a high rate of speed during this phase, oil is being pumped as at $k$ through the delivery passage and into the impeller chamber.

During the phase of operation shown in Fig. 17 the combined effect of the impeller and the vanes on the housing to move oil into the reservoir is much greater than the effect of the pump to feed oil back into the clutch chamber. Consequently, the emptying of oil out of the clutch chamber will continue, despite the counteraction of the pump.

The removal of oil from the clutch chamber gives rise to a tendency for a vacuum to develop in the chamber which would retard further removal of oil. In addition, the feed of oil into the reservoir gives rises to a tendency for air pressure in the region of the reservoir to build up. Both of these undesirable effects are avoided by providing air removal means to separate the air from the oil in the reservoir and this separated air is then conducted through appropriate conduit means into the clutch chamber. The replacement of the fluid in the clutch chamber by air from the reservoir is taking place during the phase shown in Fig. 17. At this point in the operation the impeller is rotating rapidly while the runner and elements associated therewith are rotating quite slowly.

Fig. 18 shows the position of the oil a short time after the phase shown in Fig. 17.

It is preferable to retain some fluid in the clutch chamber because, if the chamber were entirely empty, there would be no fluid subject to the action of the impeller to gradually increase the speed of rotation of the runner.

Fig. 18 shows the phase of operation when the smallest quantity of oil remains in the clutch chamber. In other words, when the phase shown in Fig. 18 is reached, the impeller ceases to expel oil from the clutch chamber and the pump will thereafter gradually fill the clutch chamber.

Note that in Fig. 18 the speed of rotation of the runner has increased to the point where centrifugal force urges the oil in the clutch chamber to travel, as indicated by the arrows $l$, in a vortical path, without traveling inwardly (as at $g$ in Fig. 17) into the spoiler chamber. Since the impeller is still traveling considerably faster than the runner, the annular body of oil in the clutch chamber will tend to be thrown into the runner, which causes the body of oil to have a cross sectional shape as indicated in Fig. 18.

Fig. 19 shows the position of the oil after the pump has begun to refill the clutch chamber with oil. Since the difference in speed between impeller and runner is not as great as during the phase shown in Fig. 18, the inside contour of the annular body of oil will be flatter than that shown in Fig. 18. In other words, there will be a reduced tendency for the body of oil to be lopsided in the direction of the runner. Also note in Fig. 19 that centrifugal force has increased to the point where the oil in the reservoir is thrown outwardly and the air accumulates in the region of the shafting as at $m$.

As the working chamber fills with hydraulic fluid, the air is displaced back into the bore of the shaft from whence it can either travel out through the end of the shaft or outward through the slots in the shaft baffle.

Fig. 20 shows the position of the oil when the runner and the load have come up to speed, i. e., Fig. 20 shows normal running operation of the invention. The clutch chamber has been completely filled with oil by the pump, and some oil is also in the spoiler chamber. The oil level in the impeller chamber outside of the clutch chamber will be such that oil will spill over into the reservoir through the central opening in the baffle plate. During this phase of operation the piston of the pump is traveling into and out of the cylinder very slowly. The pump displaces a small amount of oil into the impeller chamber and a small amount of oil feeds back into the reservoir. However, the main body of the oil will travel in a vortical path in the clutch chamber as indicated by the arrows $n$.

When the motor is shut off the elements rapidly come to rest and the hydraulic fluid settles under the action of gravity. The clutch is then ready to repeat the cycle. Thus it is that the invention provides completely automatic means for emptying the working chamber during start up and then gradually refilling it at a rate which will not excessively overload the motor.

With respect to the oil level diagrams of Figs. 16 to 20, it is pointed out that, even though the start up operation of the invention was carefully observed through a transparent plate, the changes take place so rapidly that considerable difficulty is encountered in attempting to accurately portray the position of the oil during the various phases of operation. Nevertheless, these figures are believed to illustrate the operational phases substantially accurately and they are included as an aid to clear understanding of the invention.

Figure 21:
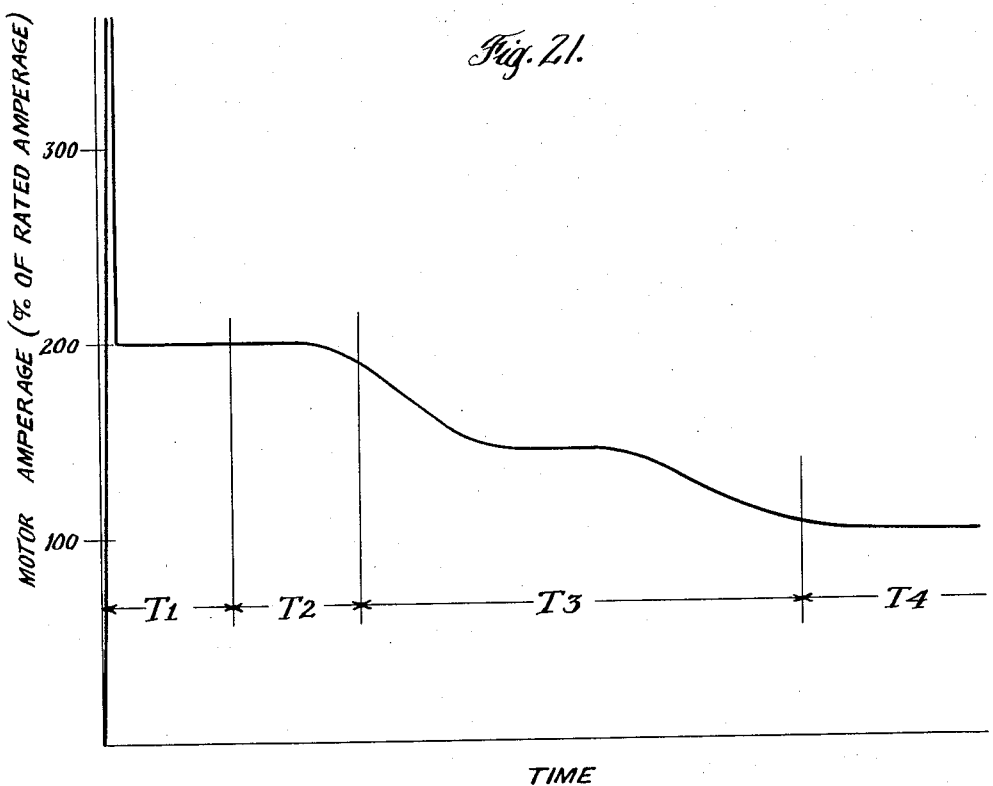
Figure 21 is a plot of motor amperage against time.

Attention is now turned to the curve shown in Fig. 21. This curve is a plot of motor amperage versus time and is included to facilitate an understanding of the effect of the above mentioned small and large ports in the cylinder wall.

A general discussion of the characteristics of the curve as a whole follows. Almost at the instant the motor is turned on, the amperage jumps to a value on the order of several hundred percent of rated amperage. Almost as instantly the amperage drops to about 200% of rated value where it remains substantially constant throughout time periods T1 and T2, to be described in more detail hereinafter. The amperage falls, levels off, and falls again during time period T3 and then remains constant at rated value during normal operation, indicated as time period T4.

Time period T1 corresponds to the operational phases illustrated in Figs. 16 to 18. In other words, during time period T1 the impeller and vanes on the housing are emptying oil out of the clutch chamber. During this period the pump is relatively ineffective to fill the impeller chamber, even though it is operating at a high rate of speed. The size and location of the small and large ports is of little significance during time period T1.

At the start of time period T2 the impeller ceases to expel oil from the clutch chamber and the pump begins to gradually refill the chamber. Since the relative speed between the shaft and housing is high, the pump will be operating at a relatively high rate of speed. The area of the small port is sufficiently small so that no significant quantity of oil is bled to the reservoir during the extremely short period of time before the piston covers the small port on the pressure stroke. Consequently the small port has almost no effect on the characteristics of the amperage curve. On the other hand, the large port is sufficiently large so that the pump is ineffective to deliver oil out through the discharge valve until the large port is covered by the piston. If the large port is located nearer to the shafting, it will be covered by the piston earlier in its pressure stroke and, therefore, the pump displacement will be increased. Increased pump displacement results in a faster rate of filling of the impeller chamber which, in turn, tends to increase the torque load on the motor shaft and thus tends to increase the motor amperage.

The characteristics of the amperage curve during period T2 may be varied by changing the location of the large port. As above indicated, locating the port closer to the shafting will result in a "hump" in the amperage curve in time period T2, while locating the large port closer to the bottom of the cylinder will result in a "dip" in the amperage curve during time period T2. Changing the size or location of the small port will not have any appreciable effect on the curve characteristics during period T2.

Time period T3 begins at the point when the pump has slowed down sufficiently so that a significant quantity of oil escapes out the small port before it is covered by the piston. Naturally, the larger the capacity of the small port, the sooner will it be effective to bleed a significant quantity of oil. Therefore, the size of the small port has a bearing on the duration of time period T2 and the commencement of time period T3.

During time period T3 the size and location of the small port are particularly effective in determining the characteristics of the amperage curve. The pump displacement (and rate of filling) may be increased primarily by locating the small port farther from the bottom of the cylinder and secondarily by reducing the size of the small port. The resulting increase in displacement would show up as an amperage curve higher than that shown in period T3. If the small port is located closer to the piston bottom and/or is larger in size, an amperage curve below that shown in period T3 would result.

Period T4 begins at the point when the pump is operating so slowly that no oil is forced out the discharge valve until both the large and the small port are covered by the piston. During period T4 the pump has a constant displacement per stroke which is determined by the cylinder volume between the cylinder bottom and the small port.

We claim:

1. In a fluid coupling having an impeller, a runner, a work chamber therebetween and a power shaft for driving the impeller; the combination of a housing mounted to rotate with the runner; a housing baffle carried by the housing adjacent the back of the impeller; said housing baffle dividing the housing into an impeller chamber and a reservoir; angularly disposed fluid directing vanes on the housing adjacent the periphery of the impeller; air removal means rotating with the shaft and projecting into the reservoir; a fluid pump in the reservoir; means for driving the pump at a speed which is directly proportional to the relative speed of rotation of the shaft and the housing; said pump drawing from the reservoir and delivering to the impeller chamber; and air conduit means interconnecting the air removal means and the work chamber; said housing baffle being constructed to provide a fluid passageway adjacent the shaft, and said air removal means and air conduit means providing for removal of air from the reservoir and delivery thereof to the work chamber.

2. A fluid coupling according to claim 1 wherein the air removal means comprises a pair of spaced discs, one of said discs being provided with a generally radial slot-like opening the trailing edge of which is offset from the leading edge toward the other of said discs, and further in which said air conduit means interconnects the space between said pair of spaced discs and the work chamber.

3. A fluid coupling according to claim 2 in which the second mentioned disc projects into the reservoir closely adjacent the housing baffle and conforms to the contour thereof, and in which said second mentioned disc is provided with generally radially extending fins on the side adjacent the housing baffle.

4. In a fluid coupling having an impeller, a runner, a work chamber therebetween and a power shaft for driving the impeller; the combination of a housing mounted to rotate with the runner and generally surrounding the impeller; a baffle carried by the housing adjacent the back of the impeller and dividing the housing into an impeller chamber and a reservoir; said baffle being constructed to provide a fluid passageway adjacent the shaft which passageway connects the impeller chamber and reservoir; fluid directing vanes in the impeller chamber constructed and arranged to cause fluid to flow from the impeller chamber into the reservoir through said passageway; a pump located in and drawing from the reservoir, fluid conduit means for delivering fluid from the pump to the impeller chamber; means for driving the pump at a speed which decreases as the speed of the runner approaches that of the impeller; and air conduit means extending between the reservoir and the work chamber.

5. A fluid coupling according to claim 4 wherein the air conduit means includes a passageway in the shaft which is in communication with the work chamber through a port in the impeller hub.

6. A fluid coupling according to claim 4 wherein the fluid directing vanes include vanes on the periphery of the impeller.

7. A fluid coupling according to claim 4 in which the pump comprises a cylinder secured to said housing, a piston mounted for reciprocation in the cylinder, spring means urging the piston in the suction direction, and in which the means for driving the pump comprises an eccentric on the shaft constructed and arranged to drive the piston in the pressure direction.

8. A fluid coupling according to claim 4 in which the pump is provided with disc type inlet and outlet valves and resilient means urging the valve discs outwardly toward flow occluding position, said valve discs being composed of nylon.

9. A fluid coupling according to claim 4 in which the air conduit means includes a bore in the shaft in communication with the work chamber via air passage means extending from said bore through the impeller hub, and further including a spoiler ridge in the region of the hub of the impeller, said ridge being located inwardly from the openings of said air passage means, said ridge defining a spoiler chamber surrounding the shaft.

10. A fluid coupling according to claim 4 wherein the fluid directing vanes include vanes on the housing adjacent the periphery of the impeller.

11. A fluid coupling according to claim 10 wherein the vanes on the housing are extended inwardly toward the shaft on the face of the housing baffle adjacent the impeller.

12. A fluid coupling according to claim 4 in which the pump comprises a cylinder secured to said housing and a piston mounted for reciprocation in the cylinder, and in which the cylinder wall is provided with a port venting the bottom of the cylinder to the reservoir but covered by the piston near the end of the pressure stroke.

13. A fluid coupling according to claim 12 in which the cylinder wall includes a second port venting the cylinder to the reservoir which is longitudinally spaced toward the shaft from the first mentioned port.

14. A fluid coupling according to claim 12 in which the capacity of the port is sufficiently small so that it is substantially ineffective at relatively high pump speeds.

15. A fluid coupling according to claim 14 in which the cylinder wall includes a second port venting the cylinder to the reservoir which is longitudinally spaced toward the shaft from the first mentioned port and which is of sufficiently large capacity to render the pump ineffective until covered by the piston.

16. In a fluid coupling having an impeller, a runner, a work chamber therebetween and a power shaft for driving the impeller; the combination of a housing mounted to rotate with the runner and generally surrounding the impeller; a baffle carried by the housing adjacent the back of the impeller and dividing the housing into an impeller chamber and a reservoir; said baffle being constructed to provide a fluid passageway adjacent the shaft which passageway connects the impeller chamber and reservoir; means in the impeller chamber effective during high relative speeds between the impeller and housing to cause fluid to flow relatively rapidly from the impeller chamber into the reservoir through said passageway; a pump in said reservoir driven by said shaft and operative to return fluid gradually to the impeller chamber during low relative speeds between the impeller and housing whereby to avoid harmful overloading of the prime mover; and air conduit means extending between the reservoir and the work chamber.

17. A fluid coupling according to claim 16 wherein the means which cause rapid fluid flow from the impeller chamber into the reservoir include fluid directing vanes on the housing adjacent the periphery of the impeller.

18. A fluid coupling according to claim 16 wherein the means which cause rapid fluid flow from the impeller chamber into the reservoir include scoops on the periphery of the impeller which scoops have discharge openings axially disposed to emit fluid toward the housing baffle.

References Cited in the file of this patent

UNITED STATES PATENTS

| | | |
|---|---|---|
| 1,726,454 | Rayburn et al. | Aug. 27, 1929 |
| 1,910,696 | Kiep | May 23, 1933 |
| 1,963,720 | Sinclair | June 19, 1934 |
| 2,078,597 | Beaumont | Apr. 27, 1937 |
| 2,363,983 | Miller | Nov. 28, 1944 |
| 2,372,748 | Swift | Apr. 3, 1945 |
| 2,570,768 | Clerk | Oct. 9, 1951 |

FOREIGN PATENTS

| | | |
|---|---|---|
| 692,286 | Great Britain | May 23, 1951 |